United States Patent [19]
Bower

[11] 3,749,175
[45] July 31, 1973

[54] EMERGENCY FIRE EXTINGUISHER

[75] Inventor: James C. Bower, North Olmstead, Ohio

[73] Assignee: Atomic Fire Equipment Co.

[22] Filed: Apr. 10, 1970

[21] Appl. No.: 27,366

Related U.S. Application Data

[63] Continuation-in-part of Ser. No. 824,797, May 15, 1969, abandoned.

[52] U.S. Cl................................ 169/31 P, 251/263
[51] Int. Cl.............................................. A62c 13/00
[58] Field of Search................ 169/30, 31; 222/176; 251/357, 263; 15/327

[56] References Cited
UNITED STATES PATENTS

| | | | |
|---|---|---|---|
| 2,580,448 | 1/1952 | Mapes et al. | 169/31 |
| 2,745,700 | 5/1956 | Phalen | 169/30 X |
| 2,904,305 | 9/1959 | Novotny | 169/31 X |
| 3,009,681 | 11/1961 | Carter et al. | 251/357 X |
| 3,051,652 | 8/1962 | Olandt | 169/31 |
| 3,058,527 | 10/1962 | Dennis et al. | 169/31 |
| 3,105,458 | 10/1963 | Downham | 169/31 X |
| 3,400,863 | 9/1968 | Brown | 222/176 X |

*Primary Examiner*—M. Henson Wood, Jr.
*Assistant Examiner*—John J. Love
*Attorney*—John Harrow Leonard

[57] ABSTRACT

The extinguisher comprises a sealed spherical tank precharged with dry fire extinguishing powder and gaseous media under pressure sufficient to expel the power through a syphon tube. The tube has an inlet near the tank bottom and an outlet connected to a control valve on the top of the tank. A relatively short discharge hose having a dispensing nozzle at its discharge end controlled by a manual valve is connected to the valve.

Three wheels support the tank. They are arranged in a triangular pattern, the front wheel being a caster having an upright swivel axis disposed forwardly of the tank. The extinguisher is small enough to be hand propelled and steered by one man by pulling on the hose.

The discharge hose is secured to the caster wheel bracket close to the swivel axis of the caster wheel and close to the level of the center of gravity of the extinguisher so that, as the extinguisher is pulled and steered by the hose, caster wheel foremost, the line of pull is constrained to pass substantially through the swivel axis and below the center of gravity of the extinguisher.

The tank has a check valve for admitting precharging gaseous media into the tank through the syphon tube, and near its top has a filling opening for powder sealed by a detachable cap. The cap has an additional check valve operable for admitting and releasing pressurized gaseous media, selectively, from a level above the powder while the tank remains upright.

All of the wheels are of a selected diameter large enough to prevent upsetting of the extinguisher as it is pulled and steered by the hose, even over rough terrane.

15 Claims, 4 Drawing Figures

Patented July 31, 1973 3,749,175

INVENTOR.
James C. Bower,
BY John H. Leonard,
his ATTORNEY.

Patented July 31, 1973  3,749,175

INVENTOR.
James C. Bower,
BY John H. Leonard,
his ATTORNEY.

EMERGENCY FIRE EXTINGUISHER

This application is a continuation-in-part of my copending U.S. Pat. application Ser. No. 824,797, now abandoned, filed May 15, 1969, and entitled "Fire Extinguisher."

This invention relates to a fire extinguisher employing dry finely powdered fire extinguishing material.

It is directed specifically to a wheel supported fire extinguisher of the precharged and sealed type so arranged that it may be manually propelled and steered to the site of use, through doors and narrow passageways, around sharp corners, up and down curbs and stairways, and over ledges, by one man, without danger of toppling over, by his pulling on the relatively short discharge hose. As a result it follows the firefighter closely as he moves about performing his usual fire fighting duties.

Heretofore emergency fire extinguishers to be transported close to and about the flame site by one operator and there operated by him have been limited to a size which can be carried about by hand. Such a hand carrier extinguisher is disclosed in U. S. Pat. No. 3,105,458 of R. E. Downham, issued Oct. 1, 1963. Generally they are limited to a maximum weight of 30 pounds.

Large fire extinguishers of the motor truck transported type employing cylindrical and spherical tanks have been provided. In these, pressurized gaseous media for discharging the powder are fed continuously into the tank from a separate storage drum during the discharge of the powder from the tank. The tank is usually mounted on a heavy sled so that it can be dragged onto and off of the motor truck. Spherical tanks used in this type of extinguisher are usually in excess of 3 feet in diameter, and due to their height and the pressure of gaseous media employed, the powder tends to pack in the bottom of the tank. Accordingly, such a spherical tank is generally mounted so that it can be rotated about a horizontal axis for maintaining the powder in loose condition. The powder is discharged through the interior of a hollow axle which supports the tank for rotation. Lateral tubes are arranged in the tank and have inlets near the wall thereof for receiving the powder and admitting it into the interior of the axle.

The prior manually propelled wheel supported extinguishers employ cylindrical tanks. The tank is mounted on a two wheeled hand propelled tilt truck or on a three or four wheeled platform. Some of these tanks are precharged with a charge of powder.

In others pressurized gaseous media are supplied from an adjacent pressurized storage drum.

These types of manually propelled extinguishers have distinct disadvantages. The tanks themselves are tall, heavy and small in diameter relative to height. Since they must operate with the tank in upright position, they have a very high center of gravity.

They are not made to be moved about adjacent the flame site, but to be stored at convenient locations about a building and pushed to a general location a substantial distance from the flame site, there to remain during use. To enable the firefighter to reach the flame site, hoses 30 feet to 50 feet long are provided so that he can reach the site by pulling the hose through doors, windows, and the like, and around corners while the extinguisher itself remains stationary in the selected location.

As to the tilt truck type, an operator must tilt the truck rearwardly, push it to the site, then restore it to upright position so that it will remain in the location to which propelled, and see to it that it does not topple over. Both types are of a size and arrangement meant to employ two men for operation, one to push the extinguishers or ensemble to a general location adjacent the flame and to maintain it upright against inadvertent toppling due to pulling on the hose while the other manipulates the hose. This is because of the inherent instability of the structures, due to their weights, their very high centers of gravity, the relative small supporting wheels with their close spacing relative to tank height and their ground pattern, and the attachment of the hoses to the tops of the tanks whereby the forces imposed by any pull on the hoses are applied far above the centers of gravity and at points of application near the center of the vertically projected patterns defined by the points of engagement of the wheels with the ground. Because of these factors they cannot be propelled and steered by pulling on the hose and thereby made to follow closely behind the operator through doors, up and down stairs and ledges, and around sharp corners, substantially to the flame site. They are entirely too unstable and heavy.

Furthermore, in the upright position of a cylindrical tank, the column of powder is of small diameter and very high relative to its diameter. This ratio combined with the high pressure of the gaseous media necessarily required to apply sufficient force on the top of such a column of powder to force the powder into the bottom of the syphon tube and out through the tube and the hose, compacts the powder to a degree which interferes with the efficient discharge and the desired flow pattern of the powder. Usually, the powder compacts to such a degree that quite generally about 7 percent to 10 percent, and often as much as one-forth, of the charge cannot be discharged by the gaseous media, and accumulates and remains in a mass at the bottom of the cylindrical tank, filling a space beginning at a location directly beneath the inlet of the syphon tube and sloping upwardly and outwardly to the interior of the side wall of the tank. This necessitates an oversize tank for a required powder discharge capacity.

Typical of the hand propelled extinguishers is that shown in U. S. Pat. No. 2,745,700 of J. L. Phalen, issued May 15, 1956. In this structure, due to the small wheels, the bottom of the tank is too close to the ground. The high center of gravity and instability as to toppling render it inoperative for the present purpose.

A type of extinguisher which is mounted on a conventional tilt truck is disclosed in the U. S. Pat. No. 3,058,527 issued to D. H. Dennis et al., issued Oct. 16, 1962. This structure is one employing a cylindrical tank with somewhat hemispherical upper and lower closures at the ends. It is a self-contained pressurized unit with the tilt truck so arranged that, after the unit has been wheeled to a selected location for use, the tilt truck can be tilted upright so that its flat bottom platform rests on the ground with the wheels elevated above the ground and inoperative. It supports the extinguisher tank in its upright position at a fixed location. Its construction precludes its being pulled about by its hose, which is from 30 to 100 feet long and connected to a main valve fitting at the top center of the tank.

In all of these structures the hose is connected at the top to the tank and near the horizontal center of the extinguisher so that any attempt to propel and steer the extinguisher by pulling on the hose would tilt it forwardly if the wheels were aligned so that their path of travel was parallel to the hose, and turn it over laterally if the direction of pull on the hose were disposed at an angle to the direction in which the wheels are aligned for travel. These extinguishers are not dirigible by pulling on the hose.

These prior extinguishers, larger than the hand carried size, weight 275 pounds and up. They generally hold a charge of 200 pounds or more dry powdered fire extinguishing agent and, of necessity, are generally pressurized at a pressure of about 450 psi in order to expel the powdered agent properly. As far as can be learned, the lowest pressure used in any such wheeled extinguisher on the market is 350 psi. The high pressure is required, as mentioned, because of the shape of the tank which results in a tendency of the powder to pack under its own weight and under that of the air pressure in the cylindrical portion of the container and resist flow to the tube.

The volume of pressurized gaseous media that can be used in such a cylindrical tank is only about 6-1/4 percent of the total charge in the tank, as compared to 20 percent in the present precharged spherical tank. The pressure necessary in a cylindrical tank is about 450 psi., as compared to only 195 psi maximum in the spherical tank.

If the height of the cylindrical tank is increased to accommodate more gas, the center of gravity necessarily is raised and the pressure necessitated by the greater height of the column is increased impeding powder flow. If widened for greater capacity, then more powder is prevented from discharging by packing around the interior peripheral wall of the tank. Furthermore, increases in the diameter of the tank impose progressively increasing ratios of wall thickness to size to withstand the very high gas pressures necessary. This can add appreciable weight, disproportionately large in case of cylindrical tanks, considering that the Interstate Commerce Commission requires that the tanks be constructed to withstand six times their working pressures.

All hand propelled extinguishers must meet rigid requirements of the United States Government and of the Underwriters Laboratory.

The structural features of the prior extinguishers described thus impose a severe limit on the volume of the charge of gaseous media under pressure that can be contained in relation to the amount of powder which can be discharged effectively, and render the prior structures unsuitable for performing the functions of the present invention.

By using a spherical tank of small diameter equipped with a proper wheel support and a properly attached short length of hose, a very light weight precharged fire extinguisher of large capacity can be provided which can be manually propelled and steered by one man pulling on the hose, so as to follow the firefighter closely through doors, narrow passageways, up and down stairs, ledges, and curbs, around sharp corners, over rough terrain, and close to the fire site without danger of upsetting. As a result, all of his time and attention can be directed to fighting the fire, rather than to trying to position the extinguisher at the required location by repeated trials and trips back and forth to reposition the extinguisher and again relocate the discharge end of its hose by extending a long hose.

Furthermore, with such a spherical tank of small size, but having a volumetric discharge capacity equal to that of the presently used cylindrical tanks of wheel supported extinguishers, a larger proportion of gaseous media to powder can be contained; for example, gaseous media in the amount of about three times that used in a cylindrical tank employing a like powder charge. In the spherical tank, the gaseous media can be under less pressure because, due to the shape of the spherical tank, the powder is in a mass having a low height to diameter ratio, and therefore is under less resistance to flow and less compaction by the gaseous pressure. Furthermore, a much shorter siphon tube can be used, reducing resistance to flow and facilitating recharging. The frictional resistance to the flow of the powder is so reduced that it readily feeds down the sides of the spherical tank to the inlet end of, and up through, the relatively much shorter syphon tube. Substantially all of the powder can be discharged by the single precharge of gaseous media with sufficient media remaining to blow the syphon tube, valve, and short hose clear of residual powder.

The extinguisher can be depressurized in its upright position for recharging with powder, and can be repressurized by air at less than 200 psi pressure, an air pressure readily available in manufacturing plants.

The wheel structure and interrelation of parts is such that the extinguisher is exceedingly stable when pulled about by its hose.

Other specific objects and advantages of the invention will become apparent from the following description wherein reference is made to the drawing in which.

Figure 1:
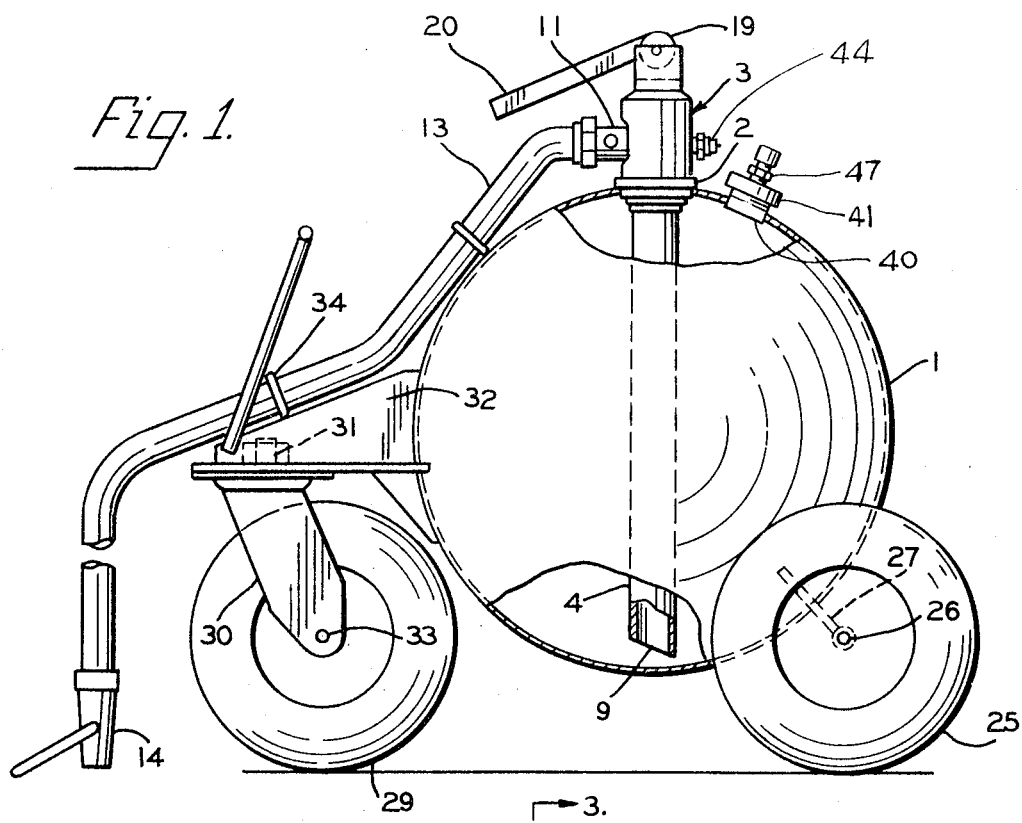
FIG. 1 is a side elevation of a fire extinguisher embodying the principles of the present invention, part thereof being shown in section for clearness in illustration.
Figure 2:
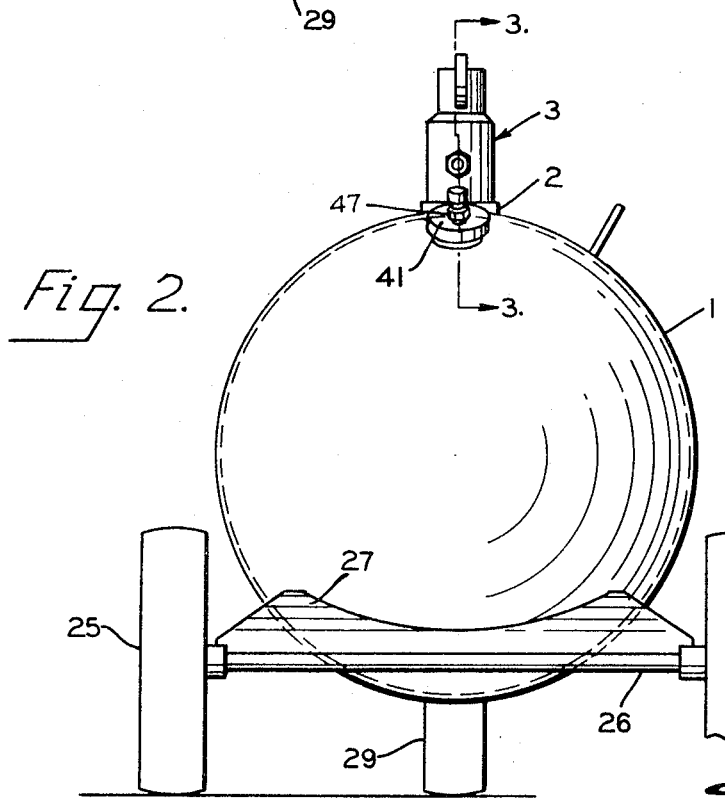
FIG. 2 is a rear elevation of the structure illustrated in FIG. 2.
Figure 3:
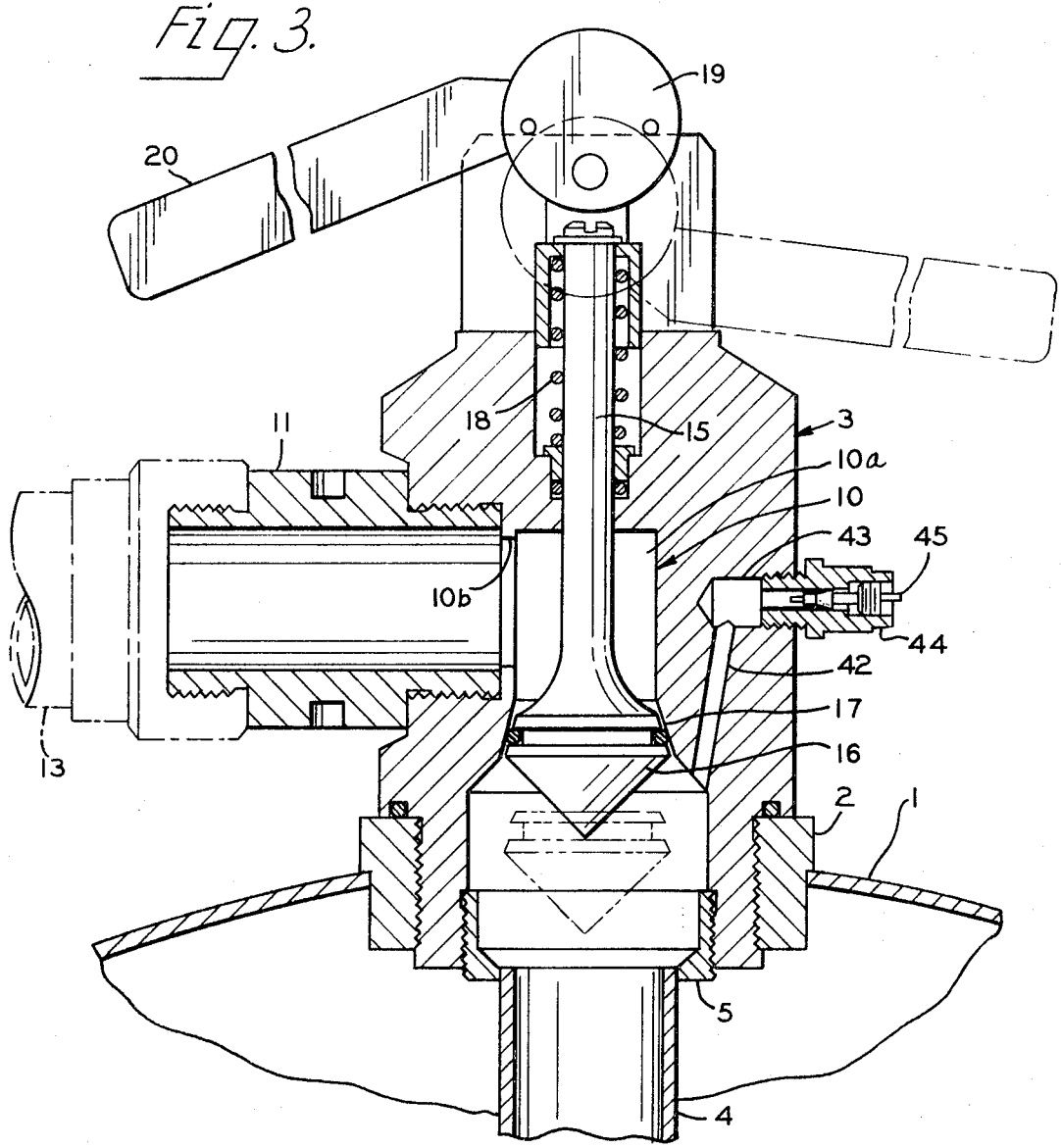
FIG. 3 is an enlarged fragmentary vertical sectional view of the extinguisher, and is taken on the line 3—3 of FIG. 2.

Referring to the drawings, the fire extinguisher comprises a spherical tank 1 which has an opening in the top in which an internally threaded collar 2 is permanently installed in sealed relation to the wall of the tank. A discharge head 3 is detachably mounted in the collar 2 in sealed threaded engagement therewith.

A syphon tube 4 is supported by the head 3 in generally upright position by means of an externally threaded sleeve 5 fixedly secured to the upper end of the tube 4. The lower end of the tube 4 extends very close to the bottom of the spherical tank 1 and is beveled, as indicated at 9, for assuring an adequate inlet into the tube for the powdered extinguishing material as it feeds downwardly and inwardly of the tank toward the tube.

The head 3 has a through passage 10 comprising an upright bore 10a and a lateral bore 10b. The outlet of the lateral bore 10b is connected by a suitable fitting 11 to a discharge hose 13 which has a conventional discharge control nozzle 14 at its outer end.

A suitable stop valve 15 is mounted in the head 3 and has a plug 16 which, in the closed position of the valve, seats on a seat 17 in the head 3 and thereby prevents the flow of gaseous media and powder from the upper or outlet end of the syphon tube 4 out through the lateral passage 10b.

The valve 15 is normally held in closed position by a spring 18 and may be moved to open position by an eccentric cam 19 manually operable by a handle 20. The cam is so arranged that when moved to position to open the valve, it passes dead center and retains the value in open position, and thereupon further control is effected by the valve 14.

The hose 13 is relatively short; for example, not to exceed about 15 feet. As a result, the fire fighter is always close to the extinguisher during its use. The extinguisher is designed to be pulled about and steered by the firefighter himself, by means of pulling on the hose.

It has been found that with a spherical tank and structure of this type, substantially all of the contained powder moves down readily along the interior walls of the tank and to the inlet of the syphon tube 4 without packing, and can be expelled in its entirely from the tank through the short tube 4 by the original charge of gaseous media at lower pressures than heretofore believed possible in connection with the wheel supported manually propelled extinguishers.

In order to assure that the extinguisher can be propelled by pulling on the hose without danger of tipping over or upsetting, the extinguisher is provided with three wheels, including a pair of coaxial rear wheels 25. The wheels 25 are arranged on a suitable shaft 26 which is fixedly secured by brackets 27 to the bottom portion of the tank 1 near the rear thereof. These wheels 25 generally are positioned a short distance outwardly beyond the lateral limits of the tank 1 and with their peripheries extending beyond the rear of the tank. The third wheel is a caster wheel 29 and is mounted in a suitable yoke 30, having a generally upright pintle 31 which swivels in a supporting bracket 32. The pintle axis is located a substantial distance forwardly from the front of the tank. The horizontal rotational axis 33 of the wheel 29 is offset in a direction rearwardly from the swivel axis so that the wheel is self-steering in response to forces imposed when the extinguisher is propelled by pulling on the hose. The wheels are arranged in a triangular pattern.

The center of gravity of the extinguisher is generally near or slightly below the level of the center of the spherical tank. However, the connection of the inlet end of the hose to the head 3 is well above the center of gravity. In order to direct properly and below the center of gravity the line of force resulting from pulling endwise on the hose for propelling the extinguisher, the hose is mechanically secured to the bracket 32 forwardly from the tank, close to the level of the tank center, as illustrated, or therebelow, and preferably substantially at or close to, the swivel axis of the pintle 31 by a clamp 34. It may be secured somewhat forwardly of the pintle axis, but such leads to increasing the fore and aft length of the extinguisher, which impedes it in turning in closely confined spaces.

As a result of this arrangement an operator standing at normal height can grip the hose and pull endwise thereon forwardly to propel the extinguisher forwardly, or pull laterally of the extinguisher and thus change its course, so that it follows the fireman closely around sharp corners, up and down stairways, through narrow doors and passages, over ledges, curbs, and rough terrain without interferring with his fire-fighting duties. When so propelled by the hose the extinguisher first adjusts itself to face in the proper direction, caster wheel foremost, by swinging about an upright axis between the wheels until the caster wheel 29 is in a line midway between the wheels 25 and extending generally endwise of the hose. The propelling force imposed by the hose when being used to pull the extinguisher passes below the center of gravity of the fire extinguisher and has little or no tendency to upset the extinguisher.

Furthermore, since the hose is connected forwardly of the tank and the horizontal rotational axis of the caster wheel, and preferably substantially at the axis of its pintle, any pull on the hose laterally of the path of travel of the extinguisher is effective to steer the extinguisher into a new course parallel to the new line of force, and no part of this pulling force imposes components on the extinguisher which tend to drag it sidewise and upset it, as they would, for example, if the new line of pull fell considerably to the rear of the axis 33 or front of the tank 1. The fire extinguisher can readily be propelled by the one fireman, even over relatively rough and circuitous paths, without danger of tipping over, simply by pulling on the hose in the customary fashion he would employ to maneuver the nozzle to the desired location relative to the fire site.

Thus, the spherical tank combines low center of gravity with accompanying stability and less weight, shorter siphon tube, ready flow of a larger effective charge of powdered material by a precharged supply of gaseous media under lower pressures than heretofore used, discharge of substantially all of the powdered material and scavenging of the valve and hose with the residue of the original supply of gaseous media.

A typical charge in the present instance may comprise a powder of pure ammonium phosphate which has been treated with silicon to render it free flowing and nonhydroscopic. Aside from the purity, the particle size is a maximum of 16 microns, as compared to 19 to 24 micron size particles commonly used in prior extinguishers.

The spherical tank is preferably about 22 inches in diameter and employs a syphon tube of about 1-1/4 inches in diameter. Such a tank can carry a charge of about 150 pounds of powder of which over seven-eighths can be discharged in as short a time as 35 seconds by the original precharge of gaseous media. It can discharge a total of 99 percent of a charge of 150 pounds, even at temperatures as low as 40° F. below zero.

The pressure of the gaseous media is about 195 psi, as compared to the usual pressure of 450 psi and up.

The wheels preferably are of a diameter about equal to the radius of the tank so that they can climb curbs and stair steps readily, and can ride into and out of the usual chuck-holes in pavements and factory yards without tipping. Further they support the tank with its bottom several inches above the ground, so that it can pass over curbs of the heights required by authoritative specifications.

The simple rigid threaded connection between the syphon tube and the tank can be used because the tube is short and does not have to be rocked laterally about a point near the top of the tank in order to make it penetrate the much less depth of the charge of powdered material made possible by the use of the spherical tank.

The tank can be charged with powder by removing the head 3 and syphon tube 4. Preferably, however, the tank is provided near the top with a threaded collar 40, which is closed by a detachable cap closure 41. The powder can be introduced through the collar 40 without detaching the syphon tube and discharge head 3.

Further, the head 3 is provided with a charging duct 42 for pressurizing it with gaseous media. The duct 42 is in communication with a passage 43 leading to the outside of the head. The duct 42 opens into the head between the open outlet end of the syphon tube 4 and the valve plug 16 in the closed portion of the valve plug 16 so that pressurized gaseous media delivered through the passage 43 can enter the spherical tank through the syphon tube 4 and thus blow back into the tank any of the powdered material that may happen to remain in the syphon tube after use in those instances in which the entire charge was not used in a prior operation.

In order to facilitate the pressurizing in this manner, a suitable filling stem 44 is provided on the head 3 and is in communication with the passage 43 for receiving the gaseous media under pressure and directing it into the tank. A suitable check valve 45 is mounted in the tube 44 or passage 43, as desired, and opens inwardly thereof upon the introduction of gaseous media under pressure to the outer end of the tube 44, and closes so as to retain the charge of compressed gaseous media within the tank. The valve 45 may be of the type commonly used in high pressure motor vehicle tires.

Ordinarily, the entire charge of powder can be expelled forcibly by the original charge of pressurized gaseous media. However, there is always the possibility of loss of some of the media and a resultant drop in pressure by improper closing of the nozzle valve 14 or main valve 15, or by a loose connection of the hose 13, or by the development of minute leaks in the hose 13. In such cases it may become desirable to pressurize the tank without blowing back through the syphon by way of the passage 42. Quite often, when thus blowing back, the extinguisher must be tilted on its side so that the powder charge is below the level of the inlet of the syphon tube. On the other hand, the leakage may deplete the pressure while the tank is nearly full and the inlet of the syphon cannot be uncovered by tilting.

Also, for servicing and various other reasons, it may become necessary to depressurize the tank from above the level of the powder.

To permit repressurizing the tank while it remains upright, and to permit depressurizing the tank without disturbing the powder charge, the cap 41 is provided with a check valve and fitting, such as that provided for the by-pass duct 42.

Figure 4:
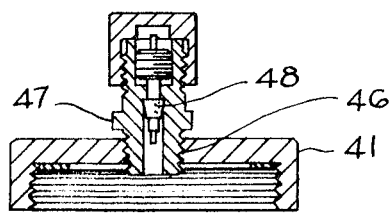
FIG. 4 is a vertical sectional view of the detachable charging cap and its valve, for charging, pressurizing, and depressurizing the extinguisher.

As illustrated in FIG. 4, the cap 41 has a passage 46 therethrough and a filling stem 47 is secured therein. The stem 47 carries a check valve 48, the same as the valve 45 heretofore described.

With the valve 48, the tank can be pressurized and depressurized, as required, without disturbing the charge.

Since the pressure required does not exceed 200 psi, the pressurized air supply generally available in manufacturing plants is adequate so that the extinguisher can be serviced at the plant in which located.

For recharging the tank, all that is necessary is to depress the valve 48 until the tank is depressurized, then remove the cap 41, introduce the requisite charge of powder, replace the cap 41, and then introduce an adequate quantity of precharging gaseous media into the interior of the tank through the stem 47 or stem 44.

As mentioned heretofore, Government specifications and Fire Underwriters Laboratory requirements must be met, and these are generally severe. If not met, the product will not be marketable. The Government insists on stability of the extinguisher against tipping. No toppling during use or propulsion is permissible.

It is to reduce the possibilities of toppling that pneumatic tired wheels of 12 inch diameter are used and that the spherical tank with its lower center of gravity and lightness is used. A comparable size tank in cylindrical form has too high a center of gravity, and due to flow characteristics in such a cylindrical tank, it must have a large height to diameter ratio, else a sufficient amount of its charge could not be expelled. Even with the best of cylindrical tanks, an increase in size greater than desired is necessary because only about 75 percent to 90 percent of the powder can be expelled, and a minimum volumetric discharge is generally necessary.

Furthermore, the Underwriters Laboratory and Government specifications are such as to require a so-called "drop test." In this test, the extinguisher is propelled forwardly off of the edge of a horizontal platform 12 inches above the floor. Without any extraneous assistance, it must land, and remain, upright.

Also, it must be capable of being propelled forwardly up or down curbs as high as 3 inches at 10 m.p.h. without upsetting.

The Interstate Commerce Commission's requirements are that the tank be capable of withstanding six times the working pressure. Any appreciable increase in tank size requires not only more wall area, but much thicker walls. The low pressure made possible by the spherical tank makes possible a great reduction in wall thickness; for example, to withstand a maximum of about 6 × 200 or 1,200 psi, as compared to 6 × 450 or 2,700 psi.

These requirements cannot be met by any wheeled extinguisher employing wheels of relatively small diameter relative to the tank diameter and height, — such, for example, as that disclosed in the above identified U. S. Pat. No. 2,745,700. The wheels, the caster wheel in particular, must be of relatively large diameter to negotiate the curb, and to assure that the bottom of the tank will be sufficiently elevated to clear the top of the curb and like obstructions, such as the rim of chuck holes.

The present extinguisher, using a spherical tank, makes possible a greater useful charge, a larger gas to charge ratio, reduced gas pressure, limited height and thinner walls, smaller size, less weight, low center of gravity, with greater mobility, such that it can be maneuvered readily without toppling over by one person using only the hose for applying the propelling and steering force.

The structure dimensionally described has a total weight, charged, of only 275 pounds, about 170 pounds less than the wheeled manually propelled extinguishers available on the market, and this is made possible largely by the spherical shape of the tank.

The wheeled manually propelled extinguishers available on the market require removal of the syphon tube for recharging with powder. Before replacing such a tube, all threads and seals must be cleaned and lubricated and the tube rocked to and fro to sink it through the powder. With the present structure, the tank, tube and valve can be blown clean by pressurized gaseous media introduced through the valve 48, while the syphon and cut-off valve remain in place, the tank then depressurized, the filling cap removed, the tank charged with powder, the filling cap replaced, and the tank pressurized through the valve 48.

There is adequate gas under pressure, even allowing for normal leakage during use, to discharge all of the powder and purge the tube, hose and valves, which, if not done, causes them to gum up, usually to an extent such that the hose must be replaced.

Should some accident cause too great a loss of pressurized gas, the tank can be pressurized immediately through the valve 48.

Having thus described my invention, I claim:

1. A manually propelled pre-pressurized fire extinguisher for discharging dry chemical extinguishing composition, and comprising:
 a spherical pressure tank;
 an up-right syphon tube connected in sealed relation in the tank and having an open lower end near the bottom of the tank and an open upper end at the top of the tank;
 the interior of said tank being open and unobstructed from the top to the bottom so as to permit the free flow to the open lower end of the syphon tube of flowable fire extinguishing powder introduced in the tank;
 a discharge head connected to the tank at the top of the tank and having a passage therethrough with one end in communication with the tube;
 a discharge hose connected at one of its ends to the head and in communication at said one end with the other end of said body passage, and being operative to discharge into the atmosphere at the opposite end of the hose;
 a stop valve in the head for opening and closing the passage therethrough, selectively;
 wheels connected to the tank and arranged to support the tank for rolling along a supporting surface in upright position, said wheels being three in number and arranged in a triangular pattern in which two wheels are at the lower rear of the tank in coaxial relation with each other, and the third wheel is a caster wheel positioned forwardly of the tank and having a generally upright swivel axis disposed forwardly from the tank and lying in a plane normal to the axis of said two wheels midway between the two wheels and having a horizontal rotational axis spaced rearwardly from the swivel axis in the normal position the caster wheel assumes when the extinguisher is being propelled forwardly;
 means to admit gaseous media under pressure into said tank and to confine it therein so long as said stop valve is closed;
 securing means securing said hose, at a portion spaced from the head to the extinguisher at a location which is in said plane and closer to said axis than to the tank, and at an elevation such that a pull endwise on the hose by an operator walking upright imposes a propelling force on the tank below the center of gravity of the tank so that by pulling on the hose the tank can be propelled without danger of overturning; and
 said extinguisher being sufficiently light in weight so that it can be propelled readily by one man by his pulling on the hose;

means to admit gaseous media under pressure into said tank and to confine it therein so long as said stop valve is closed;
 securing means securing said hose, at a portion spaced from the head to the extinguisher at a location which is in said plane and closer to said axis than to the tank, and at an elevation such that a pull endwise on the hose by an operator walking upright imposes a propelling force on the tank below the center of gravity of the tank so that by pulling on the hose the tank can be propelled without danger of overturning; and
 said extinguisher being sufficiently light in weight so that it can be propelled readily by one man by his pulling on the hose.

2. The structure according to claim 1 wherein the securing means secures said portion of the hose to the extinguisher forwardly from the horizontal rotational axis of the caster wheel in the normal position the caster wheel assumes when the extinguisher is being propelled forwardly.

3. The structure according to claim 2 wherein the securing means secures said portion of the hose to the extinguisher substantially at said swivel axis.

4. The structure according to claim 1 wherein the head has a valve seat;
 a closure plug is disposed within the head and is seated on the seat when the valve is in closed position;
 said head has a charging passage for gaseous media opening at one end at the exterior of the head and in by-passing relation to the valve for admitting said gaseous media under pressure into the tank when the valve is closed;
 and a check valve is connected to the head and operable when open to open to admit gaseous media under pressure through the inlet passage and operable when closed to seal the charging passage.

5. The structure according to claim 1 wherein the tank has a filling opening near the top and spaced from the head, and a closure member is detachably connected to the tank in sealed relation to said filling opening.

6. The structure according to claim 5 wherein said closure member has a passage therethrough for gaseous media; and
 a check valve opening inwardly of the tank is mounted in said passage.

7. The structure according to claim 1 wherein said tank contains, when in sealed condition, a charge of dry flowable fire extinguishing powder in an amount filling the tank from the bottom partway toward the top and contains, in the space in the tank above the material, a precharge of gaseous media under sufficient pressure and in an adequate amount to discharge all of said charge from the container through the tube when the stop valve is open and to purge the tube, head passage, and hose of residual powder.

8. The structure according to claim 7 wherein the fill precharge in the tank is about 80 percent extinguishing powder and about 20 percent gaseous media.

9. The structure according to claim 1 wherein the wheels are of a diameter approximately equal to the radius of the tank.

10. The structure according to claim 1 wherein said tank has an opening in its wall near its top;

an internally threaded collar is secured to the wall in sealed relation about the opening;

said head has a threaded portion secured in sealed, threaded relation in the collar, and said head has an internally threaded portion coaxial with the collar, and the upper end of the syphon tube is in direct threaded engagement with said internally threaded portion and is held thereby with the tube in fixed upright operating position in the tank.

11. A fire extinguisher comprising:

a container for fire extinguishing material supported by a front caster and two rear wheels, valve means fixed in fluid communication with the container for opening and closing a passage for the fire extinguishing material, the passage extending from near the bottom of the container through the valve means to a hose connected to the valve means, a frame fixed to the front of the extinguisher, guide means secured to said frame for turning the front of the fire extinguisher toward an operator in response to his pull of the hose.

12. A fire extinguisher comprising:

a container for fire extinguisher material;

a front caster wheel and two rear wheels supporting the container and arranged in a triangular pattern, the caster wheel being positioned at the front of the extinguisher and near to the front of the container, having its swivel axis disposed forwardly from the container, and having its horizontal rotational axle spaced rearwardly from the swivel axis in the normal position the caster wheel assumes when the extinguisher is being propelled forwardly;

an elongated discharge hose having a discharge end;

means connecting the hose to the extinguisher so that the hose can receive material from the lower portion of the container and so that a portion of the hose is in fixed position relative to the swivel axis of the caster wheel and is near the position, forwardly and rearwardly of the extinguisher, of the rotational axis of the caster wheel in said normal position of the caster wheel, for thereby causing the front of the extinguisher to turn toward an operator in response to a pull by the operator on the hose, near the discharge end thereof, sufficient to propel the extinguisher by the hose in the direction of pull; said portion being at a height above the bottom of the wheels, when the wheels are on the ground, such that the line of force of said pull on the hose is directed below the center of gravity of the container; and said fire extinguisher being sufficiently light in weight so that it can be propelled by a single operator applying said pull by holding onto the hose near its discharge end while walking generally upright in a direction away from the extinguisher.

13. The structure according to claim 12 wherein the container is spherical.

14. The structure according to claim 13 wherein the container is positioned so that, with the wheels resting on the ground, the bottom of the container is disposed below the level of the top of the wheel rims.

15. The structure according to claim 12 wherein said connecting means includes a valve connected to the top of the container and having an outlet connected to the inlet end of the hose and an inlet connected with a siphon tube leading to near the bottom of the container.

* * * * *